United States Patent [19]
Phillips

[11] Patent Number: 4,876,629
[45] Date of Patent: Oct. 24, 1989

[54] UNDERGROUND CONTROL HOUSING

[76] Inventor: Michael R. Phillips, P.O. Box 1064, Benton Harbor, Mich. 49022

[21] Appl. No.: 211,579

[22] Filed: Jun. 27, 1988

[51] Int. Cl.⁴ ............................................. H02B 1/20
[52] U.S. Cl. ................................... 361/391; 361/340; 361/393; 174/37; 16/223; 16/233; 16/352
[58] Field of Search ............... 312/223, 298, 300, 308, 312/309; 174/37 X, 52.1; 16/352 X, 223 X, 233 X; 439/131, 142; 361/331, 332, 340, 356, 359, 390, 391, 393, 394, 396, 417, 419, 420, 428, 334

[56] References Cited
U.S. PATENT DOCUMENTS

| | | | |
|---|---|---|---|
| 817,748 | 4/1906 | Boulden | 16/352 |
| 2,689,293 | 9/1954 | Claybourn | 174/57 |
| 2,968,689 | 1/1961 | Johnson | 174/48 |
| 3,710,199 | 1/1973 | Cignoni, Jr. | 361/391 |
| 3,745,399 | 7/1973 | Usizima | 361/391 |

*Primary Examiner*—Gerald P. Tolin
*Attorney, Agent, or Firm*—James D. Hall; Thomas J. Dodd; Todd A. Dawson

[57] ABSTRACT

A control housing for storing control boxes below ground level. The housing includes an arm for raising the controls out of the housing for access. A rotatable lift assembly is connectable to a position sensitive control box and maintains the position sensitive control in its original position as the arm is raised.

4 Claims, 2 Drawing Sheets

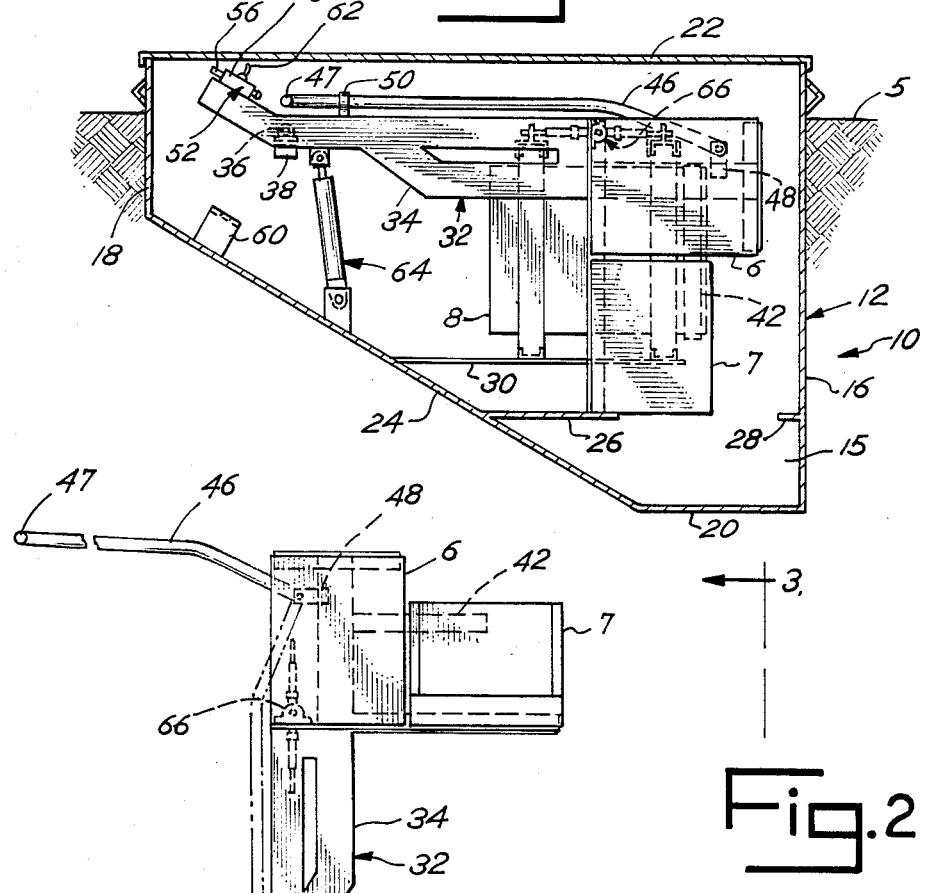
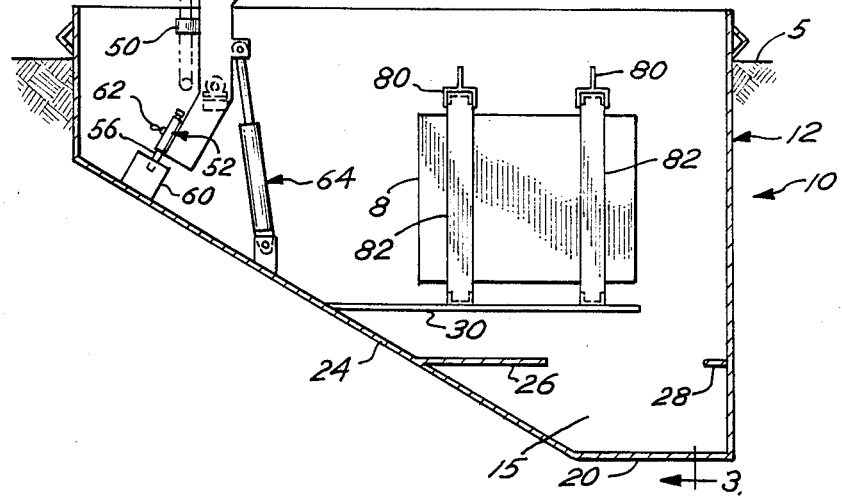

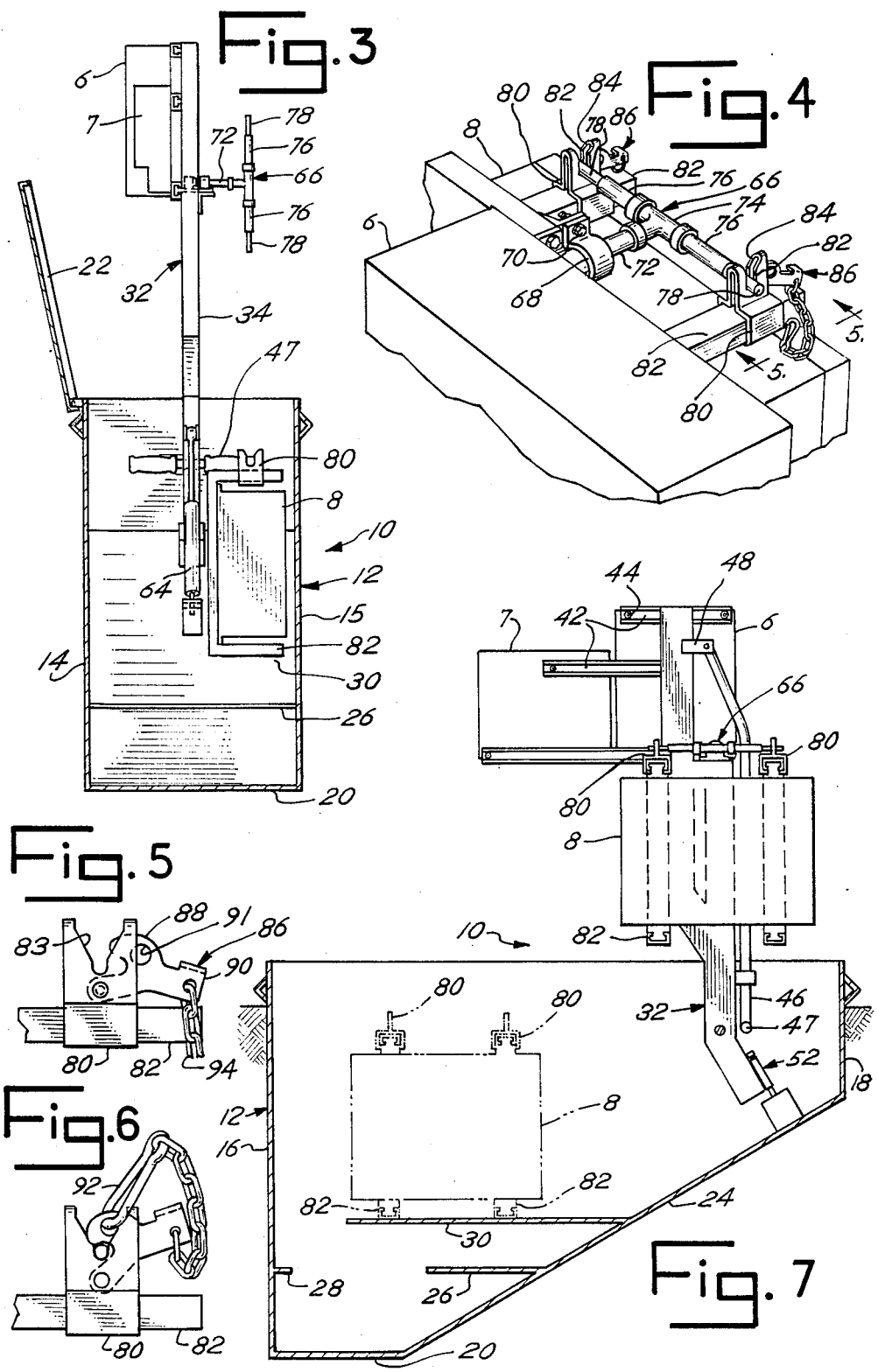

UNDERGROUND CONTROL HOUSING

SUMMARY OF THE INVENTION

This invention relates to a control housing and will have application to an underground control housing.

Heretofore, electronic controls for regulating underground pumps or the like have been either housed in a control room approximately eighteen feet below ground level or mounted to plywood suspended between two vertical poles. One problem associated with prior control housings relates to the aesthetic damage caused to the area. It is obviously quite unattractive to place these controls above ground and damaging to the area to bury a housing eighteen feet below the ground. Further, although an access shaft is provided to the buried housing, repairs on the enclosed controllers are often burdensome and expensive.

The control housing of this invention eliminates the above problems by providing a control housing which is substantially below ground level but which is easily accessible. To further facilitate repair of the housed controls, a mounting arm is provided which pivots out of the housing to raise the controls above ground level for repair.

Accordingly, it is an object of this invention to provide a control housing which is substantially beneath ground level.

Another object of this invention is to provide a control housing wherein the control panels are mounted to a pivotal arm to facilitate repair of the controls.

Further objects of this invention will become apparent upon a reading of the following description taken with the accompanying drawings.

BRIEF DESCRIPTION OF THE DRAWINGS

FIG. 1 is a cross sectional view of the control housing in the recessed storage position.

FIG. 2 is a cross sectional view of the control housing of FIG. 1 in the extended service position and the motion sensitive control down.

FIG. 3 is a cross sectional view taken along line 3—3 of FIG. 2.

FIG. 4 is an enlarged fragmentary perspective view of the pivotal lift assembly.

FIG. 5 is a fragmentary elevational view taken along line 5—5 illustrating the locking mechanism of the pivotal lift assembly in the unlocked position.

FIG. 6 is a fragmented elevational view of the locking mechanism of FIG. 5 in its locked position.

FIG. 7 is a cross sectional view of the control housing with the arm and motion sensitive control in its up position.

DESCRIPTION OF THE PREFERRED EMBODIMENT

The preferred embodiment herein described is not intended to be exhaustive or to limit the invention to the precise form disclosed. It is chosen and described to enable others skilled in the art to utilize its teachings.

Control housing 10 as shown in the figures is adapted for placement substantially below ground level 5. Housing 10 encloses control boxes 6 and 7 and position sensitive control box 8, which are of conventional construction. Housing 10 includes a housing box 12 having two side walls 14, 15, end walls 16 and 18 and a botoom wall 20. Lid 22 fits over walls 14–18 to form an enclosed structure for protection of control boxes 6, 7 and 8. Bottom wall 20 includes an angled portion 24. A shelf 26 extends from angled portion 24 a distance into housing box 12 substantially perpendicular to walls 14–18. In a similar fashion, shelf 28 extends a partial distance from end wall 16 towards shelf 26. Together shelves 26, 28 and bottom 20 define a lower chamber within housing box 12 for collection of moisture that seeps into the housing. A sump pump and float switch arrangement (not shown) could be placed within the chamber to remove any such moisture. Box 12 further includes shelf 30 which extends from angled wall part 24 along side wall 15. Position sensitive control box 8 is seated upon shelf 30, as illustrated in FIG. 3.

Control housing 10 further includes a lift mechanism 32 for raising and lowering boxes 6, 7 and 8. Lift mechanism 32 includes an arm member 34 which is pivotally connected by shaft 36 and bearing assemblies 38 to housing side walls 14 and 15. Control boxes 6 and 7 are fixedly connected to arm 34 near its distal end by straps 42 and bolts 44. A handle 46 having a grip 47 is pivotally connected to the distal end of arm 34 by a pair of oppositely extending protrusions (not shown). Handle 46 is rotatably accommodated within bores formed within brackets 48. Handle 46 is pivotable between the storage position of FIG. 1 and the lifting position of FIG. 2. A clip 50 frictionally retains handle 46 in its storage position.

A locking mechanism 52 is positioned adjacent the proximal end of arm 34 and includes a bolt 56 slidably retained by a bracket 58 and biased in the extended position of FIG. 1. A strike plate 60 is attached to angled wall portion 24 and defines a hole for accommodating bolt 56 when arm 34 is in the position of FIG. 2. A finger tab 62 projects outwardly from bolt 56 for manual release of the bolt from strike plate 60. An air cylinder assembly 64 is connected between arm 34 and angled wall portion 24 to control movement of arm 34 and boxes 6, 7 and 8.

A rotatable lift assembly 66 is rotatably connected to arm member 34 opposite control boxes 6 and 7. Lift assembly 66 as best illustrated in FIGS. 4–7 includes roller bearing assembly 68 which is attached to arm 34 by bracket 70. A rod 72 is connected to bearing assembly 68 and extends toward side wall 15. Rod 72 is connected at its other end to a T joint 74. A pair of rods 76 are connected to T joint 74 and extend from opposite sides of joint 74. Each rod 76 includes a locking pin 78 which extends therefrom. A pair of brackets 80 are connected to supports 82 of position sensitive box 8. Each bracket 80 defines a slot 83 having bevelled edges 84. Slots 83 accommodate locking pins 78 as illustrated in FIG. 4 when arm 34 is in its down position of FIG. 2. Each bracket 80 includes a latch member 86 connected to bracket 80 and pivotable between the unlocked position of FIG. 5 and the locked position of FIG. 6. Each latch member 86 includes a hook part 88 and an extending finger tab 90. A hole 91 is formed in hook portion 88 for accommodating a clip 92 when the latch member is in its locked position of FIG. 6. A chain 94 is connected between clip 92 and finger tab 90 to retain the clip when not in use.

In use, housing 10 is typically in the position of FIG. 1 with lid 22 latched to housing box 12, arm 34 down and control box 8 supported on ledge 30. To access control boxes 6 and 7, lid 22 is pivoted to its open position of FIG. 3. Latch members 86 are pivoted into the unlocked position of FIG. 5. The user then pulls upwardly on handle grip 47 to release handle 46 from clip 50. To raise arm member 34 and access control boxes 6 and 7, the user pulls on handle 46 to pivot the arm upwardly and toward the user about shaft 36. When arm 34 reaches the fully raised up position of FIG. 2, both 56 of locking mechanism 52 contacts strike plate 60 and is urged into the bore formed in plate 60 to lock arm 34 in the raised position. As arm 34 pivots upwardly piston assembly 64 extends as illustrated in FIG. 2.

It should be noted that in the raised position of FIG. 2, control boxes 6 and 7 are pivoted 90° from their original position shown in FIG. 1. Such positioning is only possible if boxes 6 and 7 contain components not sensitive to motion or are not gravity dependent.

To release arm 34, the user pulls on tab 62 to urge the bolt out of the strike plate 60 hole. When released, arm 34 is free to pivot toward its down position. Piston assembly 64 slows the downward movement of arm 34 in much the same fashion as a pneumatic cylinder in a door assembly.

To exercise the option of raising box 8 for service, latch members 86 are pivoted into their locked position of FIG. 6 with locking pins 78 seated within slots 82 of brackets 80. To prevent latch members 86 from shifting during the raising process previously described, clip 92 is placed through the latch member hole which abuts either bracket edge upon the member attempting to shift. As arm 34 is lifted in the fashion described previously, lift assembly 66, under weight of box 8, rotates about bearing 68 to maintain box 8 in the upright orientation of FIG. 7 as arm 34 is lifted into its raised up position. Similarly, upon lowering arm 34, assembly 66 rotates about bearing 68 to maintain box 8 in its upright position. Maintaining a control box in its upright position is imperative when the box contains components such as contactors and electro-mechanical switches which are gravity sensitive.

It should be understood that the invention is not to be limited to the details given above, but may be modified within the scope of the appended claims.

I claim:

1. A housing which stores controls below ground level wherein controls are contained within a plurality of control boxes, said housing including a pair of side walls and a pair of end walls, and a bottom wall to define an enclosure, said housing including pivot means carried within said enclosure for lifting said control boxes out of said housing, said pivot means including an arm operatively connected to said control boxes at a proximal end thereof, and a distal end attached to said housing, said arm pivotable between a lowered storage position and a raised service position, at least one of said control boxes housing position sensitive equipment, said one control box supported within said enclosure and including latching means for detachably and pivotally connecting the one control box to said pivot means whereby said one control box remains in its original orientation as the arm is pivoted into its raised service position.

2. The housing of claim 1 wherein said latching means includes a joint rotatably connected to said arm, said joint including oppositely extending lock pins, said one control box including lock means for connecting said joint to the one control box through said lock pins.

3. The housing of claim 2 wherein said lock means includes spaced brackets, each bracket defining a slot means for housing a said lock pin, and a latch member pivotally connected to said bracket for securing said lock pins within said slot means.

4. The housing of claim 1 wherein said arm includes means for locking said arm in its said raised service position.

* * * * *